United States Patent
Mäenpää et al.

(10) Patent No.: US 9,357,001 B2
(45) Date of Patent: May 31, 2016

(54) LOCATION AWARE MASS INFORMATION DISTRIBUTION SYSTEM AND METHOD

(75) Inventors: Jouni Mäenpää, Nummela (FI); Tuomas Erke, Espoo (FI)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 238 days.

(21) Appl. No.: 13/498,648

(22) PCT Filed: Oct. 1, 2009

(86) PCT No.: PCT/IB2009/007022
§ 371 (c)(1),
(2), (4) Date: Mar. 28, 2012

(87) PCT Pub. No.: WO2011/039555
PCT Pub. Date: Apr. 7, 2011

(65) Prior Publication Data
US 2012/0271895 A1    Oct. 25, 2012

(51) Int. Cl.
*G06F 15/16* (2006.01)
*H04L 29/08* (2006.01)
*H04L 12/18* (2006.01)

(52) U.S. Cl.
CPC ............. *H04L 67/104* (2013.01); *H04L 12/18* (2013.01); *H04L 67/1046* (2013.01); *H04L 67/1048* (2013.01); *H04L 67/1053* (2013.01); *H04L 67/1065* (2013.01); *H04L 67/1089* (2013.01)

(58) Field of Classification Search
CPC ............ H04L 67/1089; H04L 67/1065; H04L 67/1053; H04L 67/1048; H04L 67/1046; H04L 67/104; H04L 12/18; H04L 67/1056
USPC .......................................................... 709/206
See application file for complete search history.

(56) References Cited

U.S. PATENT DOCUMENTS 7,418,454 B2 * 8/2008 Chen et al.
7,457,257 B2 * 11/2008 Tang ....................... H04L 45/02
370/256

(Continued)

FOREIGN PATENT DOCUMENTS

EP          1 587 282 A2    10/2005

OTHER PUBLICATIONS

International Search Report in corresponding PCT Application No. PCT/IB2009/007022 mailed Aug. 2, 2010.

(Continued)

*Primary Examiner* — Kevin Bates
*Assistant Examiner* — Nazia Naoreen
(74) *Attorney, Agent, or Firm* — Patent Portfolio Builders, PLLC

(57) ABSTRACT

A system, node and method for location aware mass information distribution to peers. The method includes overlaying a distributed hash table (DHT) network over an existing physical communication network to which the peers are connected, wherein the DHT network is a peer to peer (P2P) network; providing at least one application layer multicast (ALM) protocol over the overlayed DHT network to form an ALM tree topology for the peers, wherein the ALM tree topology is based on location information of the peers; using the ALM tree topology for establishing logical connections within a group, between a leader of the group and peers of the group; and using the overlayed DHT network for establishing connections, between the leader and the peers, to be followed by a message to be distributed to the peers.

18 Claims, 12 Drawing Sheets

(56) References Cited

U.S. PATENT DOCUMENTS

| | | | |
|---|---|---|---|
| 7,801,538 B2* | 9/2010 | Weiser | H04L 12/18 370/312 |
| 7,925,781 B1* | 4/2011 | Chan | H04L 69/166 709/203 |
| 7,991,858 B2* | 8/2011 | Shi et al. | 709/220 |
| 2007/0123220 A1* | 5/2007 | Weiser | H04L 12/18 455/412.1 |
| 2008/0276091 A1 | 11/2008 | Welin et al. | |

OTHER PUBLICATIONS

International Preliminary Report on Patentability in corresponding PCT Application No. PCT/IB2009/007022 mailed Jan. 30, 2012.

Miguel Castro, et al.; "SCRIBE: A large-scale and decentralized application-level multicast infrastructure"; IEEE Journal on Selected Areas in Communications, vol. 20, No. 8; Oct. 2002; pp. 100-110.

Suman Banerjee, et al.; "Scalable Application Layer Multicast"; Department of Computer Science, University of Maryland; SIGCOMM '02; Aug. 19-23, 2002; pp. 205-217; Pittsburgh, PA.

Ion Stoica, et al.: "Chord: A Scalable Peer-to-peer Lookup Service for Internet Applications"; MIT Laboratory for Computer Science; SIGCOMM '01; Aug. 27-31, 2001; pp. 1-12; San Diego, CA.

C. Jennings, et al.; "REsource LOcation and discovery (RELOAD) Base Protocol"; Internet Engineering Task Force (IETF); Request for Comments: 6940; ISSN: 2070-1721; Jan. 2014; pp. 1-176.

Han Z. J., et al.; "PPmcast: a novel P2P-based application-level multicast using Kamulia"; Journal of China Universities of Posts and Telecommunications; vol. 16; XP026704801; Sep. 1, 2009; pp. 114-119.

* cited by examiner

LOCATION AWARE MASS INFORMATION DISTRIBUTION SYSTEM AND METHOD

TECHNICAL FIELD

The present invention generally relates to systems, nodes and methods and, more particularly, to mechanisms and techniques for providing mass information to plural users by a system that is aware of the location of the users and also uses the users to communicate in a peer to peer fashion.

BACKGROUND

During the past years, the evolution of mobile communication devices has been explosive. The mobile communication device is becoming an accessory that every person owns, irrespective of the country. The functionalities added to the mobile communication devices, as for example, camera, video, music player, personal digital assistant, map provider, text messaging, email, calendar, etc., have made these devices indispensable for many persons.

The large penetration of the mobile communication devices has made them a target for adding even more functionalities, which, in the example to be discussed next, can save lives. Some areas in the world are prone to natural disasters. Natural disasters like tsunamis, hurricanes, typhoons, earthquakes, etc. occur from time to time and lives may be lost when those living in these areas are not made aware about the imminent disasters.

There are certain specialized processes that are available to be implemented in these areas for informing the people living there about the imminent disasters. However, these solutions have certain limitations and therefore, the indication of a potential disaster may go unnoticed by people in those regions.

Also, there are other crisis situations in which mass information sharing for people living in certain areas is needed. For example, a given event may impact only a small geographical area and so, this event may not be relevant to users who are not within this small area or the users that are not traveling to this small area. Examples of such cases are car crashes, icy roads, etc., i.e., local events, in which the small geographical area may cover a few roads including the car crash.

There are some existing crisis information sharing services utilizing a Short Messaging Service (SMS), for instance, Tsunami SMS (see for example www.tsunamisms.com). Such services deliver short messages in the event of natural disasters to users that have subscribed to this specific service. FIG. 1 illustrates such a system 10 having a centralized network component 12 that communicates with mobile communication devices 14 via SMS messages 16.

A problem with SMS based warning systems is that they require use of centralized network components 12, which can become bottlenecks and introduce a single point of failure to the system. In other words, if such a centralized network component 12 fails for some reasons, the entire system fails to distribute the SMS messages to the subscribers. In addition, the SMS based warning systems also place a heavy load on the network because an SMS messages has to be sent individually to each user, i.e., a central point sends the same message N times to the N users. Further, SMS-based solutions do not work in peer-to-peer networks, such as Peer-to-Peer Session Initiation Protocol (P2PSIP) based person-to-person communication networks being standardized in the Internet Engineering Task Force (IETF). Furthermore, SMS messages have no priority in the physical network and the user may not often even notice the message when he or she is, for example, driving a car or talking on the phone as the users receive many SMS messages, most of which are unimportant.

Accordingly, it would be desirable to provide devices, systems and methods that avoid the afore-described problems and drawbacks.

SUMMARY

When mass information needs to be sent in a reliable way to the users, the system distributing the information should not fail and the information should be distributed to the users that are located in a geographical area for which the information is pertinent.

According to one exemplary embodiment, there is a method for location aware mass information distribution to peers. The method includes a step of overlaying a distributed hash table (DHT) network over an existing physical communication network to which the peers are connected, wherein the DHT network is a peer to peer (P2P) network, a step of providing at least one application layer multicast (ALM) protocol over the overlayed DHT to form an ALM tree topology for the peers, wherein the ALM tree topology is based on location information of the peers, a step of using the ALM tree topology for establishing logical connections within a group, between a leader of the group and peers of the group, and a step of using the overlayed DHT network for establishing connections, between the leader and the peers, to be followed by a message to be distributed to the peers.

According to another exemplary embodiment, there is a system for location aware mass information distribution to peers. The system includes a distributed hash tables (DHT) network overlayed over an existing physical communication network to which the peers are connected, wherein the DHT network is a peer to peer (P2P) network; an application layer multicast (ALM) protocol provided over the overlayed DHT to form an ALM tree topology for the peers, where the ALM tree topology is based on location information of the peers; and at least a node, which is part of the physical communication network, configured to use the ALM tree topology for establishing logical connections within a group, between a leader of the group and peers of the group, and to use the overlayed DHT network for establishing connections, between the leader and the peers, to be followed by a message to be distributed to the peers.

According to still another exemplary embodiment, there is a node for coordinating location aware mass information distribution to peers. The node includes a first application-level interface configured to interact with a distributed hash tables (DHT) network overlayed over an existing physical communication network to which the peers are connected, wherein the DHT network is a peer to peer (P2P) network; a second application-level interface configured to communicate with an application layer multicast (ALM) protocol provided over the overlayed DHT to form an ALM tree topology for the peers, where the ALM tree topology is based on location information of the peers; and a processor configured to communicate with the first and second application-level interfaces and configured to use the ALM tree topology for establishing logical connections within a group, between a leader of the group and peers of the group, and to use the overlayed DHT network for establishing connections, between the leader and the peers, to be followed by a message to be distributed to the peers.

It is an object to overcome some of the deficiencies discussed in the previous section and to provide a system that does not fail if a central component fails. One or more of the independent claims advantageously provides a reliable mass distribution procedure that is aware of the users' locations.

BRIEF DESCRIPTION OF THE DRAWINGS

The accompanying drawings, which are incorporated in and constitute a part of the specification, illustrate one or more embodiments and, together with the description, explain these embodiments. In the drawings.

ABBREVIATIONS

Figure 1:
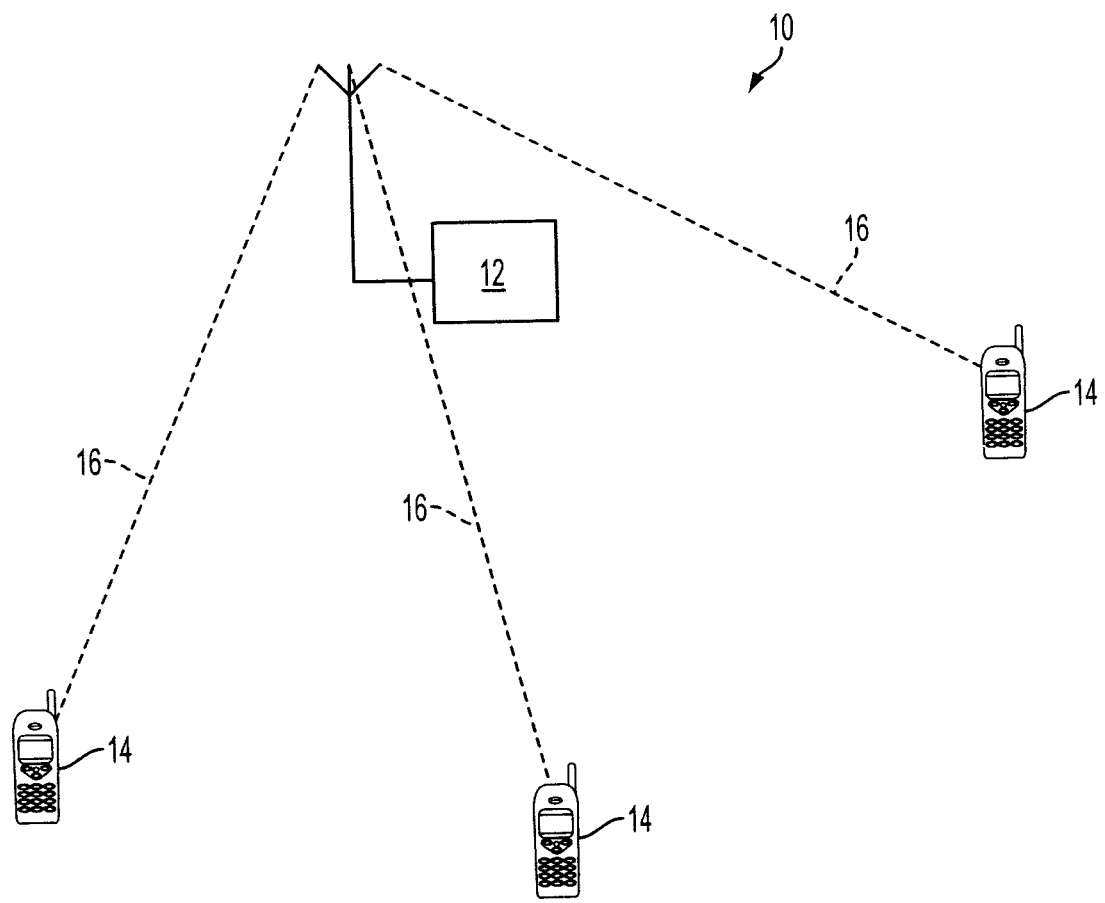
FIG. 1 is a schematic diagram of a conventional wireless network.

ALM Application Layer Multicast
API Application Programming Interface
CA Certificate Authority
CRP Country Responsible Peer
DHTs Distributed Hash Tables
DRP District Responsible Peer
GPS Global Positioning System
IETF Internet Engineering Task Force
IMSI International Mobile Subscriber Identity
IP Internet Protocol
JP Joining Peer
JSR Java Standardization Request
LAMG Location Area Multicast Group
LAMID Location Aware Mass Information Distribution in distributed hash table based overlay networks
LARP Location Area Responsible Peer
LTE Long-Term Evolution
MA Micro Area
MAID Micro Area Identifier
MARP Micro Area Root Peer
NAT Network Address Translator
NICE NICE is the Internet Cooperative Environment
P2P Peer-to-Peer
PRP Province Responsible Peer
P2PSIP Peer-to-Peer Session Initiation Protocol
RELOAD REsource LOcation And Discovery
SIP Session Initiation Protocol
SMS Short Messaging Service
TCP Transmission Control Protocol
TRP Town Responsible Peer
UDP User Datagram Protocol
URI Uniform Resource Identifier
VoIP Voice over Internet Protocol
WCDMA Wideband Code Division Multiple Access

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of a Distributed Hash Table (DHT) Overlay Network and an Application Layer Multicast (ALM) protocol. However, the embodiments to be discussed next are not limited to these systems but may be applied to other existing systems.

Reference throughout the specification to "one embodiment" or "an embodiment" means that a particular feature, structure, or characteristic described in connection with an embodiment is included in at least one embodiment of the present invention. Thus, the appearance of the phrases "in one embodiment" or "in an embodiment" in various places throughout the specification is not necessarily all referring to the same embodiment. Further, the particular features, structures or characteristics may be combined in any suitable manner in one or more embodiments.

The Location Aware Mass Information Distribution for distributed hash table based overlay networks (LAMID) system proposed in this disclosure may use at least two peer-to-peer paradigms, Distributed Hash Table (DHT) and Application Layer Multicast (ALM) to distribute mass announcements to users in a location-aware manner. Both DHT and ALM are discussed next.

A DHT is a type of a structured overlay network. A structured overlay network establishes static connections between the users, i.e., these connections do not change in time. To understand how a DHT works, a regular, non-distributed hash table is discussed next. A regular, non-distributed hash table is a data structure that associates keys with values. A key can be, for example, a person's name and a corresponding value of that person may be a contact address (e.g., an email address or a Session Initiation Protocol (SIP) Uniform Resource Identifier (URI)). The primary operation of a hash table is to support a lookup function, i.e., given a key, the hash table finds the corresponding value.

DHT provides a lookup service similar to a hash table. However, unlike regular hash tables, DHT is a decentralized distributed system. In a DHT, the responsibility for maintaining mappings from names to values is distributed among the nodes participating in the system. A node may be, in a communication network, a server, a computer, a mobile communication device, etc. This responsibility is achieved by partitioning the key space among the participating nodes.

Figure 2:
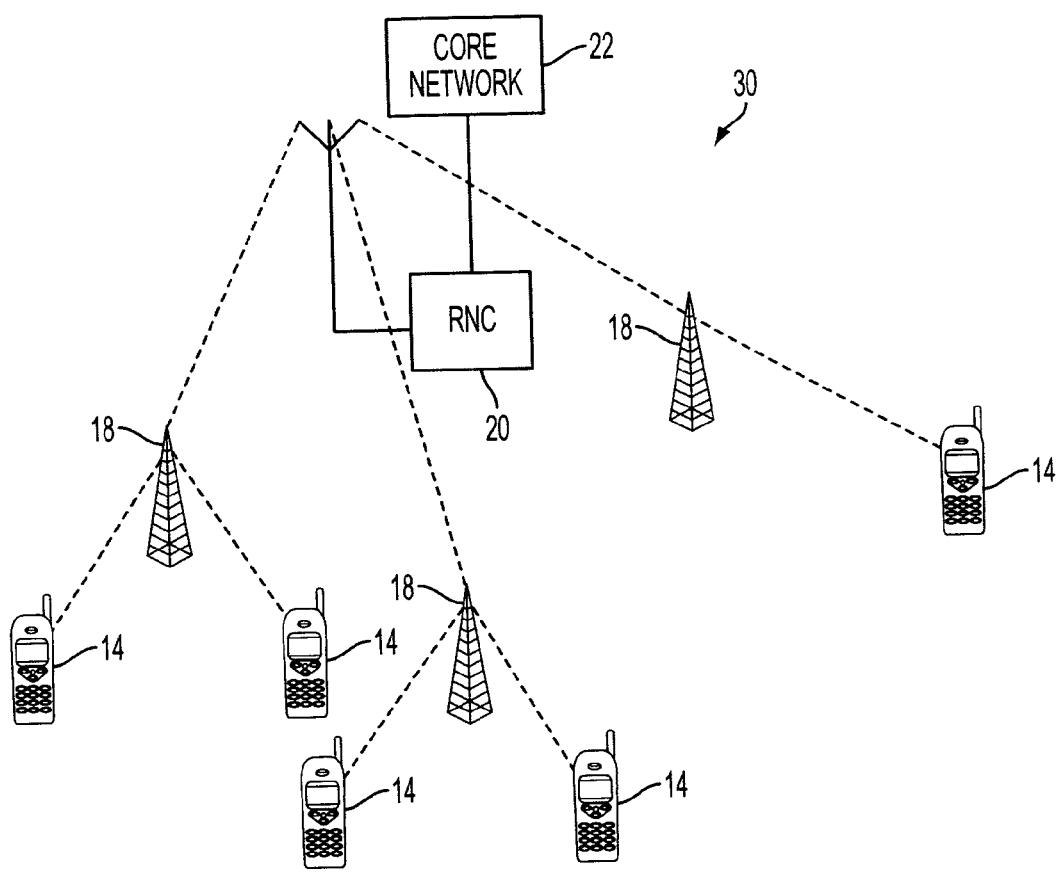
FIG. 2 is a schematic diagram of a wireless network in which the users are connected to a peer to peer network.

The nodes, which are part of a physical network, for example, a telecommunication network 30 as shown in FIG. 2, are connected together by an overlay network, which allows the nodes to find the owner of any given key in the key space. The physical network 30 may include base stations 18 that are connected to a Radio Network Controller (RNC) 20, which in turn communicates with a core network 22. Those skilled in the art would recognize that the generic name base station may include a NodeB for a Wideband Code Division Multiple Access (WCDMA) network, or an eNodeB for an Long-Term Evolution (LTE) system, etc. The same is true for the RNC and other components of the network.

In the overlay network, which is different from the physical network 30 in the sense that the same nodes (base stations 18 and mobile communication devices 14) are used but the connection logic is different, each node maintains a set of links to other nodes. This set of links makes the node's routing table. In some DHTs such as Chord (which is described in Stoica et. al., Chord: A Scalable Peer-to-peer Lookup Service for Internet Applications, Proceedings of the ACM SIGCOMM'01 Conference, August 2001, San Diego, Calif., USA, the entire content of which is incorporated here by reference), the entries in the routing table are called fingers. However, in this system and other systems, the nodes along the path from one node in the ALM tree to another node in the ALM tree need to maintain state information (they need to be aware of other nodes on the path) while in LAMID, the nodes do not need to maintain any state information.

Figure 3:
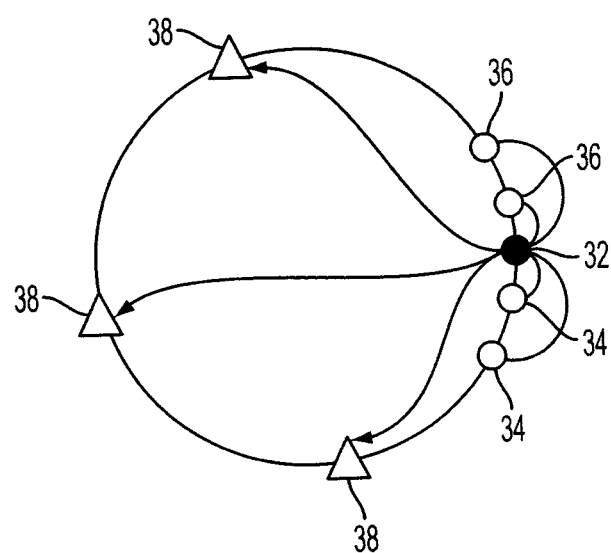
FIG. 3 is a schematic diagram illustrating how a node maintains contacts with neighboring nodes and other nodes in a network.

In addition to the routing table, each node also maintains another data structure called the neighbor list. The neighbor list contains pointers to the immediate successors and predecessors (i.e., neighbors) of the node in the overlay network. FIG. 3 shows a node 32, its successors 34, its predecessors 36, and fingers 38. All these elements 32, 34, 36 and 38 correspond to physical nodes. Thus, a node 32 picks its neighbors 34 and 36 according to a certain structure, called the network's topology. The difference between neighbors 34 and 36 (which can be either predecessors or successors) and fingers 38 is illustrated in FIG. 3, in which a ring topology is assumed.

Each peer participating in the DHT is identified by its peer identifier (peer-ID), which may be created by calculating a hash over a certain piece of unique information of the peer. Such unique information may be the node's IP address and port number. DHT may use Secure Hash Algorithm One (SHA-1) as the base hash algorithm. In DHT, node identifiers and resource identifiers (i.e., keys) are stored in the same namespace. As an example, in the Chord DHT, each peer is responsible for storing resources whose identifiers fall between its predecessor's peer identifier and its own peer identifier. In the same way as peer-IDs, resources identifiers are constructed by calculating a hash over a piece of information that uniquely identifies the resource. For example, if the resource record is the contact address of a user's SIP terminal, the resource-ID can be formed by calculating a hash over the user's SIP URI. In a DHT, a user is responsible for storing his or her own contact information only if the resource-ID of his or her contact information falls in the portion of the identifier space the user's endpoint is responsible for.

Having been discussed the DHT, the ALM protocol is discussed next. Network layer multicast (also known as Internet Protocol (IP) multicast) is a method of simultaneously forwarding IP datagrams to a group of receivers. In network layer multicast, messages are delivered over each physical link of the network only once. Copies of the messages are created only when the links to the multiple receivers split. As an example, if a message needs to be delivered from a remote server to ten users located in the same local area network, only one message needs to be sent through the network to the router or switch in the local area network. Separate copies of the message are created only at the router or switch of the local area network. This approach is different from unicast transmission, in which messages are sent to single network destinations. If the same message would be delivered using unicast, then ten copies of the message would be generated at the remote server and all ten messages would be sent across the network to the users, which is not efficient.

Although network level multicast is an efficient and scalable mechanism to support group communication applications, it has not been widely adopted by commercial Internet Service Providers (ISPs). One reason for this lack of support among the commercial ISPs is that the network level multicast requires investments in new routing infrastructure, which is undesirable.

ALM protocols, also known as end system multicast or peer-to-peer multicast protocols, do not need to change the network infrastructure. Instead, they implement all multicast forwarding functionality at the end hosts. Thus, instead of replicating messages inside routers of the core network, in ALM, messages are replicated at end hosts. The end hosts form an overlay network that typically uses a tree topology.

Figure 4:
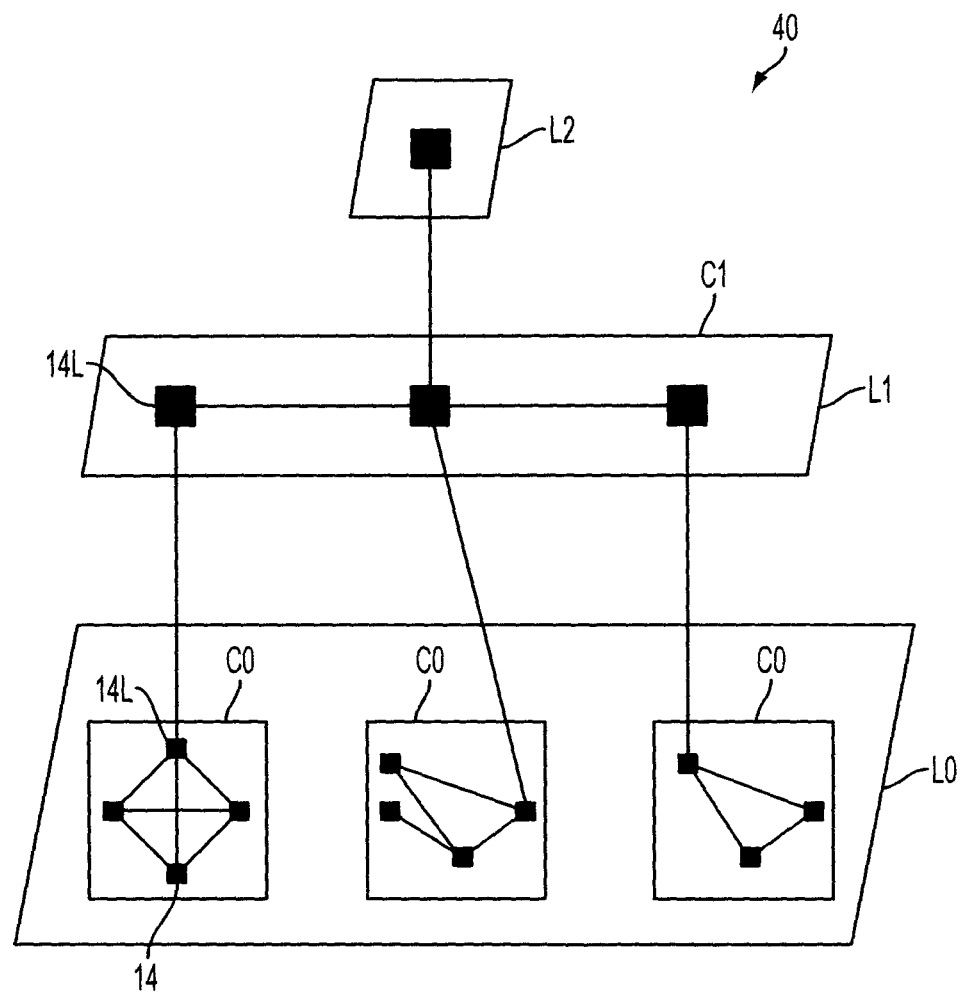
FIG. 4 is a schematic diagram illustrating how peers are grouped in a tree.

FIG. 4 shows an example of an ALM tree 40. In an ALM tree 40 peers 14 can be assigned to different layers L0 to L2 as disclosed by Banerjee et al. (Scalable Application Layer Multicast, Proceedings of ACM Sigcomm 2002, Pittsburgh, Pa., August 2002, the entire content of which is incorporated here by reference) and shown in FIG. 4. Peers 14 in each layer are partitioned into a set of clusters C0 and C1. Each cluster has a cluster leader 14l. The cluster leader 14l can be selected, for example, by selecting the peer 14 that is in the theoretic centre of the graph of the cluster. All peers 14 may be part of the lowest layer L0. The cluster leaders 14l of all the clusters in Layer i join also in Layer i+1. There are at most log k(N) layers, where k is a constant system parameter and N is the number of the peers 14. Clusters may have a maximum and minimum size limit. A cluster that exceeds the cluster upper size may be split into two clusters. Alternatively, clusters that are too small may be merged into one larger cluster.

Peer-to-peer overlay networks such as structured overlay networks based on DHT are decentralized systems that do not have a single point of failure. They can operate in the absence of centralized components. However, they do not support simultaneous delivery of information to multiple receivers in an efficient manner. Existing DHT-based overlay networks such as P2PSIP overlay networks are designed for direct communication between two users and thus do not provide a way to efficiently distribute information to a subset of the users or all of the users. In other words, the existing DHT-based overlay networks do not provide a way to deliver broadcast or multicast information such as public warnings. These networks also do not provide a way to reach users based on their location information.

The following exemplary embodiments, among other things, attempt to address this shortcoming of DHT-based overlay networks by proposing a solution that can be used to efficiently deliver announcements to large number of peers in a location-aware manner.

Location Aware Mass Information Distribution service for DHT-based overlay networks (LAMID) is a system in which the peers participating in a DHT network use an ALM protocol to create application-layer multicast distribution trees among geographically close peers. LAMID can be used to distribute information (e.g., announcements) among peers located within a particular geographical area. Thus, LAMID has both the advantage of a DHT overlay network, e.g., peer to peer communication capability, and the advantage of an ALM protocol, e.g., the capability to efficiently deliver a single piece of information to multiple receivers.

LAMID is targeted for DHT-based P2P overlay networks, such as Peer-to-Peer Session Initiation Protocol (P2PSIP) overlay networks. A LAMID system may include two parts: a bottom-level overlay network (e.g., a global P2PSIP Voice over IP (VoIP) telephony network), and multiple ALM-based multicast delivery networks built on top of the DHT that includes the peers located within the same geographical area.

Figure 5:
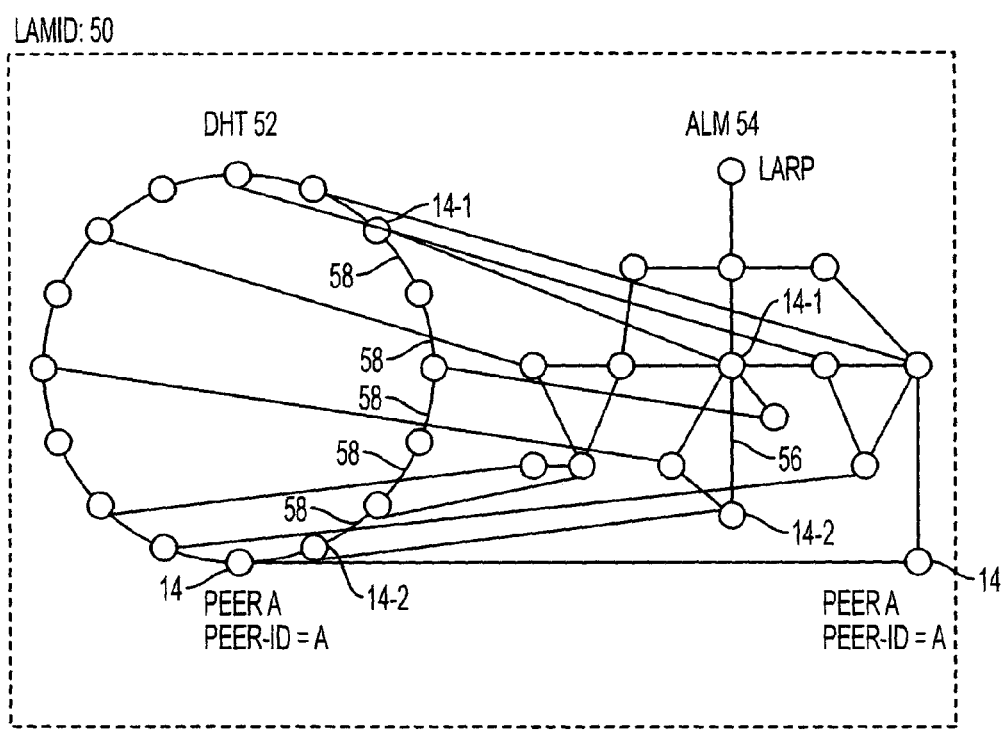
FIG. 5 is a schematic diagram illustrating a novel peer connection according to an exemplary embodiment.

According to an exemplary embodiment, a LAMID architecture may have the structure shown in FIG. 5. FIG. 5 shows the LAMID system 50 having the DHT 52 overlayed network and the ALM tree structure 54. The same peers 14 are differently connected in the DHT 52 and ALM 54. All peers in the LAMID network are part of the same bottom-level overlay network 52. The bottom-level overlay network 52 uses a DHT algorithm to organize the peers 14. In addition to the DHT-based bottom-level overlay 52, the LAMID network 50 also includes multiple ALM trees 54 using a multicast tree structure. The ALM trees 54 can be thought of as overlay networks built on top of another overlay network, which is the bottom-level overlay 52. Thus, all the links in the ALM tree 54 correspond to a path that can include multiple links in the underlying bottom-level overlay network 52. For example, consider peer 14-1 and 14-2. It can be seen that a logical link 56 between the two peers 14-1 and 14-2, which is a direct link between these two peers in the ALM tree 54, corresponds to a multitude of links 58 in the DHT network 52. It is noted that links 58 between peers 14-1 and 14-2 involve other peers (not labeled in FIG. 5) and the physical connections between these two peers may be implemented as internet connections between the two peers. These connections are not static, i.e., the number of other peers between peers 14-1 and 14-2 in DHT 52 may change continuously, depending on the set up of DHT 52.

In other words, in the LAMID system only the links in the bottom-level overlay run over direct connections (TCP connections or UDP associations) between the peers. For links in the ALM tree, no direct connections are maintained. Instead, messages from one peer in the ALM tree to a neighboring peer in the ALM tree are routed across the bottom-level overlay by tunneling the messages as bottom-level overlay messages. Neighbors in the ALM tree are typically not neighbors in the bottom-level overlay.

According to an exemplary embodiment, since there are no direct connections between neighboring peers in the ALM tree, two messages sent between the same two peers within a short time interval may follow different paths across the bottom-level overlay. Intermediate peers in the bottom-level overlay forwarding tunneled messages along the path between the two neighbors in the ALM tree do not need to maintain any state information regarding the path.

To the contrary, Scribe (Castro et al., Scribe: A Large-Scale and Decentralize Application-Level Multicast Infrastructure, IEEE Journal on Selected Areas in Communications, Vol. 20, No. 8, October 2002, the entire content of which is incorporated here by reference) has a multicast tree that includes peers (called Forwarders) that are not part of the multicast group and for this reason these peers need to maintain additional state information to be able to forward messages of group members. In other words, Scribe uses the underlying network to establish static routes in the multicast tree. However, the exemplary embodiments discussed above do not establish static routes.

LAMID system groups peers that are geographically close to each other to the same ALM tree. The geographic closeness of two peers may be defined by the operator of the system, depending on the purpose of the mass information to be distributed. For example, peers that are in the same city may be considered to be geographically close from an earthquake event point of view but not for a car crash event. Thus, the closeness of the peers depends from application to application. Each location area may have its own ALM tree. A location area can be a country, state, city, district, or a micro area.

A micro area (MA) is the smallest location area and it corresponds to a map grid cell. Peers belonging to the same ALM tree create a Location Area Multicast Group (LAMG). The root of the ALM tree is called the Location Area Responsible Peer (LARP). There are different types of LARPs, called Country Responsible Peers (CRPs), Province Responsible Peers (CRPs), Town Responsible Peers (TRPs), District Responsible Peers (DRPs), and Micro Area Root Peers (MARPs), as will discussed later. Depending on the organization of a country, the types of the above noted LARPs may be different, i.e., the province peers may be state peers, a new level may be added (county level), a level may be removed, etc.

According to an exemplary embodiment, peers use the same peer-ID (in P2P networks, peers are uniquely identified by their peer-IDs) both in the bottom-level overlay and the ALM tree. This is illustrated in FIG. 5, in which peer A uses the same peer-ID in both the bottom level overlay network 52 and in the ALM tree 54 to which it belongs. Because of the identical peer-ID, messages exchanged between peers in the ALM tree 54 can find their way across the bottom-level overlay 52.

Next, exemplary embodiments provide more details about managing the LAMID system. Managing the LAMID includes, among others, joining the DHT, joining the ALM, leaving either the DHT or the ALM, dealing with new users, dealing with a loss of leader, electing new leaders, etc.

Figure 6:
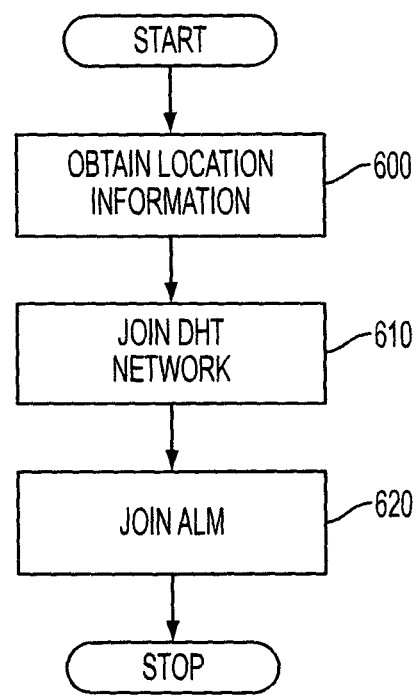
FIG. 6 is a flow chart illustrating how a peer joins a specific protocol according to an exemplary embodiment.

According to an exemplary embodiment, joining the LAMID system is discussed next with regard to FIG. 6. A peer wishing to become a part of the LAMID network (called a Joining Peer, JP) acts as follows. In step 600, the JP obtains location information, e.g., geographical location. Various possibilities for obtaining the location information are discussed later. In step 610, the JP joins the bottom-level overlay network 52. It is noted that LAMID does not require any changes to the process of joining the bottom-level overlay network, e.g., the DHT. During the joining process, the JP is assigned to a Micro location Area (MA), based on its current location that was obtained in step 600. The MA is identified by a Micro Location Area Identifier (MAID). A process for assigning peers to MAs is described later.

Having joined the bottom-level overlay, the JP uses the MAID to join in step 620 the ALM delivery tree of its current MA. This process is explained in details later. Now the JP is ready to receive localized mass announcements. According to an exemplary embodiment, the JP always joints firstly the DHT network 52 and then the ALM 54. In one application, the process of joining the DHT and ALM is performed automatically by the mobile communication device of the user, either based on triggers set up in the communication device or when the user launches a specific application.

A joining peer can obtain location information from multiple sources. One such source, in Java-enabled mobile phones, is a Java application that can obtain the cell-ID of the radio access network from the system properties interface. The LAMID system can use the cell-ID as such or transform the cell-ID to geographic coordinates (of the base station) using a cell-ID to coordinates mapping service. This service is described later. Another source, in a phone equipped with a Global Positioning System (GPS) receiver, is the built-in receiver. Still another source, in case of phones or computers equipped with Wi-Fi, is the information sent by nearby Wi-Fi access points. Other sources may be used as would be recognized by those skilled in the art. While the above sources are applicable to mobile communication devices, i.e., a mobile phone, a mobile computer, any mobile device that is capable of supporting a connection with a base station, a fixed node (e.g., a desktop computer) can use configured coordinates. The way LAMID handles peer mobility is described later.

According to an exemplary embodiment, peers are assigned to MAs by performing a process of transforming a cell-ID of the peer to the coordinates of a base station and mapping the coordinates to MAIDs.

If a peer does not know its coordinates, but knows the cell-ID of its wireless access network, the peer may use the cell-ID to learn the coordinates of the base station with which the peer is communicating. An input to this service (e.g., coordinate mapping service) is the cell-ID and an output is the coordinates of the base station. This service may be provided either centrally, by an enrollment server, or the service may be distributed in the network. In the latter case, mapping records are stored in the overlay network. In one application, the key of the mapping record is a hash over the cell-ID and the value is the coordinates of the base station. Other methods may be used as would be recognized by those skilled in the art. The cell-ID may either be stored in the overlay, by the operator of the overlay, or alternatively, users with GPS receivers may automatically store the mappings on their communication device.

Figure 7:
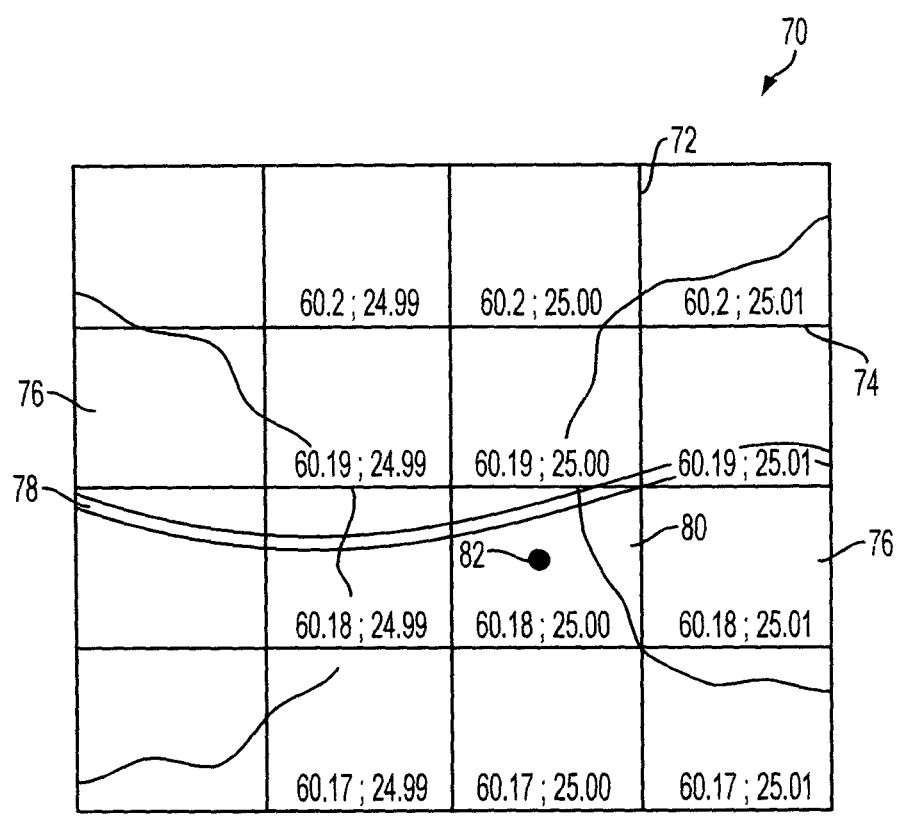
FIG. 7 is a schematic diagram of a map grid used by the novel system according to an exemplary embodiment.

Having the coordinates of the peer, these coordinates are used to map the peer to the MAID. The LAMID system may use, according to an exemplary embodiment, a map grid system. However, other map systems may be used as appropriate. A map grid system 70 is shown in FIG. 7 and is defined by longitude lines 72 and latitude lines 74 that form grid cells. The grid system 70 shows, for example, land areas 76 connected by a road 78. Each cell is defined by a latitude and longitude pair of numbers, as shown in the figure. A distance between adjacent longitude lines and adjacent latitude lines is a configuration parameter. For exemplary purposes, this parameter is 0.01 in FIG. 7.

A MA corresponds to one grid cell. A given MA is identified by the coordinates of the bottom left corner of the grid cell. The MAID is created, for example, by taking a hash over the string "<longitude>,<latitude>". As an example, the MAID of the MA of the grid cell 80 is created by taking a hash over the string "60.18,25.00".

An example of how the coordinates of peers may be mapped to a grid cells is discussed now. Assume that the position of a peer in the grid map 70 is indicated by reference sign 82, and the coordinates of the peer are given by <60.187825; 25,003209>. If the distance between grid lines is 0.01, only the two first decimal places are considered to create the MAID. This means that the coordinates of the user are not rounded up to the next integer but the decimals not considered are simply removed, meaning that the resulting coordinates of the peer are <60.18; 25.00>. Thus, the peer is located in the MA whose MAID is hash("60.18; 25.00").

Having this information, joining the ALM group is discussed next. Each MA has a Micro Area Root Peer (MARP, which may be seen as a leader), which is responsible for that specific MA and acts as the root of the MA's ALM delivery tree. Each MARP stores its contact information in the bottom-level overlay network. The contact record is identified by the MAID. Thus, to learn the contact address of the MARP of its MA, the JP fetches from the bottom-level overlay the record whose key is the MAID.

Once the JP has learned the contact address of the MARP, the JP sends the MARP a request which, according to an exemplary embodiment, is referred to as the JoinLAMG request to join the LAMG. The details of joining the LAMG depend on the ALM protocol being used.

If the JP is the first peer within the MA, no contact record can be found from the overlay using the MAID. In this case, the JP becomes the MARP and stores in the overlay network a new record whose key is the MAID and whose value is the contact address of the JP. Next, creating the links in the ALM tree is discussed.

In conventional ALM systems, peers belonging to an application-layer multicast group maintain direct links with a subset of other peers belonging to the same group as dictated by the ALM algorithm. On the contrary, in LAMID, peers in the same LAMG do not maintain direct connections with each other. Instead, all the communication between peers belonging to the same LAMG takes place across the bottom-level overlay network. That is, LAMID uses the DHT of the bottom-level overlay to deliver messages to peers in the same LAMG. This is possible because peers use the same Peer-ID both in the bottom-level overlay network and the ALM delivery tree. Both the control (i.e., ALM tree maintenance) and data delivery traffic (i.e., announcements) of the LAMG may be sent across the bottom-level overlay network.

As an example not intended to limit the applicability of the exemplary embodiments, assume a situation in which the MARP that is the root of one of the LAMG's ALM delivery tree needs to either multicast a message to all the peers in the LAMG or to send a point-to-point ALM tree maintenance message to one of its neighbors in the ALM tree.

Further, assume that there are three peers A, B, and C, in the next level down from the MARP of the ALM delivery tree. To deliver a message to each of the peers, the MARP encapsulates the message in a bottom-level overlay request, which is referred to as a LAMIDTunnel request. The MARP sends three separate LAMIDTunnel requests addressed to A, B, and C. Each LAMIDTunnel request contains the message to be delivered in its payload. The LAMIDTunnel request is routed over the bottom-level overlay network using DHT routing procedures.

Each peer that is the final recipient of a LAMIDTunnel request retrieves the encapsulated message from the payload of the LAMIDTunnel request. Next, the peer inspects the type of the message. If the encapsulated message is a data delivery message, the peer multicasts the message to its neighbors in the ALM tree. If the encapsulated message is an ALM tree maintenance message, the message is processed locally.

The reasons why the ALM tree maintenance messages and data delivery messages are sent over bottom-level overlay network connections are discussed next. All peers in the LAMID systems are already part of the bottom-level overlay network. If separate connections were used for the ALM tree, this might more than double the amount of connections a single peer needs to maintain. Another reason is related to the fact that most of the peers in the Internet are located behind Network Address Translators (NATs) and firewalls. Maintaining separate connections for the ALM tree would be costly because new pinholes would need to be opened in the NATs, the amount of relayed connections would increase, and the keep-alive traffic load would increase.

Still another reason for delivering the maintenance messages and data over the bottom-level overlay network is related to the fact that LAMID is intended for delivery of infrequent data (for example, short textual announcements containing URIs to multimedia content). Thus, the load placed by the LAMID on bottom-level overlay links is relatively small. Because of the small size of the messages and their low frequency, it would be uneconomical and unpractical to maintain direct connections between peers in the ALM tree.

Next, a few details about maintaining the ALM tree are discussed with reference to a few exemplary embodiments. Peers that are members of the same LAMG, that is, peers that belong to the same ALM tree, need to exchange periodic heartbeat messages to maintain the topology of the tree. However, such messages do not need to be as frequent as the messages used to maintain the bottom-level overlay network for the following reasons.

There are no direct connections between neighboring peers in the ALM tree. Instead of maintaining direct TCP or UDP connections, the peers in the ALM tree need to remember the peer-IDs of their neighbors so that they can reach their neighbors via the bottom-level overlay. Because no direct connections are maintained in the ALM tree, for instance, no NAT keep-alive messages are needed. Thus, this configuration of the ALM protocol advantageously reduces the organization of the system and also reduces the amount of data to be exchanged by the peers for maintenance purposes.

Even if some virtual links in the ALM tree fail due to peer crashes, the peers on the other side of the crashed virtual links can be reached via the bottom-level overlay if their peer-IDs are known.

Another reason for the less frequent messages within the LAMG is related to the fact that maintaining the bottom-level overlay network takes precedent over maintaining the ALM trees, which are built on top of the bottom-level overlay network. The ALM trees can be re-created after massive failures as long as the bottom-level overlay routes messages correctly.

A final reason is related to the fact that maintaining additional links is inexpensive in LAMID as the maximum cluster size in the ALM tree can be increased. Larger cluster size decreases the probability that most of the peers in the cluster fail simultaneously. Thus, the rate of heartbeat messages among the peers of a LAMG can be lowered.

Another aspect related to the exemplary embodiments discussed above is related to the peer mobility, i.e., the fact that peers are continuously moving in and out of the LAMG and/or the ALM tree. Thus, various mechanisms are implemented for determining when a peer has moved, when the MARP fails or departs, etc.

A mobile peer periodically checks its current coordinates and maps them to the MAID using, for example, one of the procedures described above. If the resulting MAID is different than the MAID calculated during the previous period, the peer knows it has moved from one MA to another.

Figure 8:
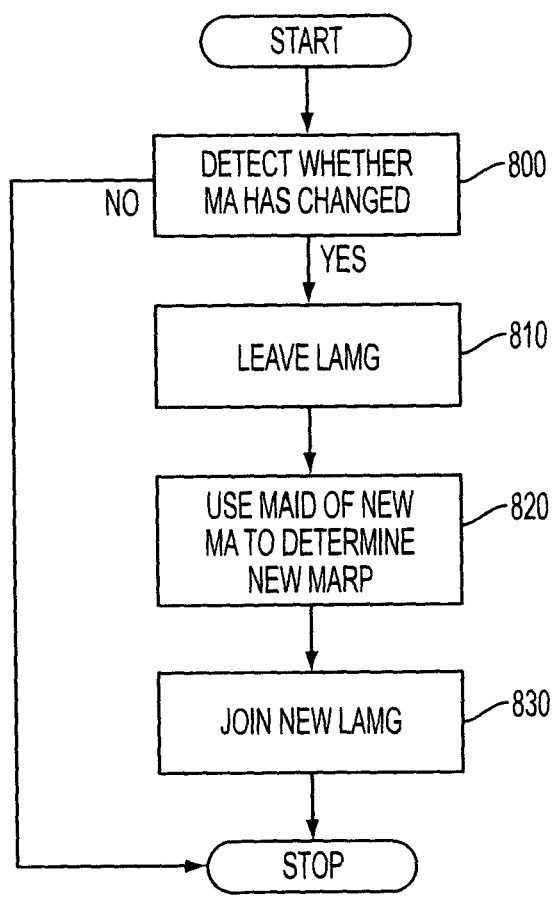
FIG. 8 is a flow chart illustrating how a peer joins a group in the novel system according to an exemplary embodiment.

A peer that detects that it has moved from one MA to another should leave the LAMG of the old MA and join the LAMG of the new MA. This process may happen as illustrated in FIG. 8. According to step 800, the peer detects whether the MA in which it is located has changed. If the response is yes, the process advances to step 810, in which the peer leaves the old LAMG of the old MA. Then, the user performs in step 820 a lookup using the MAID of the new MA as the key. In this way, the peer learns the contact information of the MARP of the new MA. Having the contact information of the new MARP, the peer joins in step 830 the new LAMG of the new MA by contacting the new MARP. However, if the peer does not determine in step 800 that MA has changed, the peer does not execute the steps 810, 820, and 830.

Like any other peer, a MARP may either crash or leave the network. According to an exemplary embodiment, these actions of the MARP are handled by the LAMID system as discussed next. For instance, if the NICE (NICE is a recursive acronym that stands for NICE is the Internet Cooperative Environment) protocol is used, a MARP that intends to leave the ALM tree removes itself from the tree by informing its neighbors. If the MARP crashes, other peers detect this event from the absence of answers to periodic heartbeat messages and they choose a new MARP.

Figure 9:
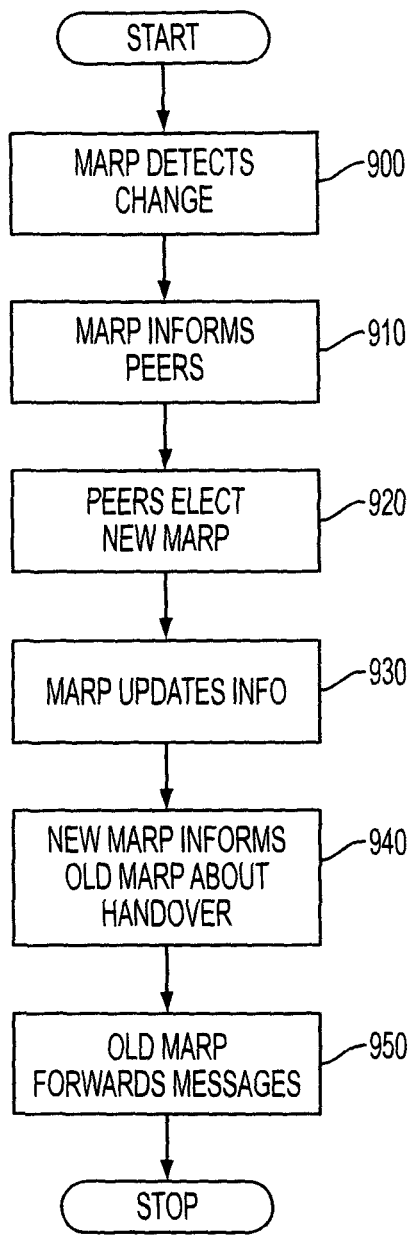
FIG. 9 is a flow chart illustrating how a leader of a group handover the leadership to a new leader when the old leader leaves the group according to an exemplary embodiment.

If the MARP is a mobile peer and it moves to a new location area, MARP will perform a soft handover of the MARP role to one of its neighbors. This action may happen according to the following procedure illustrated in FIG. 9. The MARP detects in step 900 that it has moved to a new location area using the mechanism described with regard to FIG. 8. The MARP informs in step 910 other peers that it is leaving the ALM tree. The neighbors of the MARP in the ALM tree elect in step 920 a new MARP among themselves. Details regarding electing a new leader depend on the ALM protocol used. For example, in NICE, this is done by exchanging Leader-Transfer messages.

The new MARP updates in step 930 the record identified by the MAID of its MA in the overlay network so that the value of the record contains the new MARP's contact information. The new MARP informs in step 940 the old MARP that MARP role handover is now finished and if the old MARP receives any LAMID related messages during the previous steps, the old MARP is instructed in step 950 to forward those messages to the new MARP.

The exemplary embodiments discussed so far have considered scenarios in which all the location areas (i.e., MAs) are on the same level. However, there are situations in which there is a hierarchy of location areas. The different levels in the hierarchy of location areas may be categorized in the following levels.

An International level includes a peer that is involved or responsible for interaction with other peers on an international level. For this level, there is one LARP, called the Country Responsible Peer (CRP), in each country. The CRP in a country is responsible for indicating mass events to other CRPs. These CRPs are aware of each other and so these peers can indicate mass events between countries. CPR is also responsible for indicating mass events to province level peers for country level mass events.

A Province level includes a peer that is involved and responsible for interaction with other peers on national level (with the Country Responsible Peer). Such a peer is called the Province Responsible Peer (PRP). PRPs may belong to the same ALM tree and they exchange at least ALM maintenance messages between each other.

A City or town level includes a peer that is involved and responsible for interaction with other peers belonging to the province level of the province where the city or town is located. Such a peer is called the Town Responsible Peer (TRP).

A District level includes a peer that is involved and responsible for interaction with other peers belonging to the city level of the city where the district is located. Such a peer is called District Responsible Peer (DRP).

At the lowest level of the hierarchy, there is the Micro location Areas (MAs). Each MA is controlled by a corresponding MARP. Depending on the size of the network (the number of peers which are connected to the ALM tree), some areas may be merged (e.g., in a small town, there may be no need to further divide the town into districts). The ALM tree depends from country to country, because of the organization of each country, the customs of each country, geography of each country, etc.

Peer mobility is taken into account also at levels of the hierarchy above the MA level. A LARP equipped with map software can determine, for example, whether it has moved to another district, town, province and country by using its current coordinates. This information can then be used to determine whether the peer can still continue as a LARP (if, for example, a TRP moves to a different town, it cannot continue to be the TRP of the old town anymore). A peer not equipped with map software either needs to use a centralized or decentralized coordinate to area name (e.g., district name) mapping service similar to the service described above or other services as would be recognized by those skilled in the art.

An example of international and national levels is discussed next. Consider, for example, Europe. Each country of Europe has a dedicated CRP, which is configured to interact with other CRPs of other countries for sharing information about international mass events. At the national level, a country is divided into provinces, each of which has its own PRP. Each province can still be divided into smaller areas. The smallest entity which can be handled is the MA, which is handled by a MARP.

Next, the selection of a country, province, town, district, and MA responsible peer is discussed. A District Responsible Peer (DRP) is selected from the set of MARPs within a district. A Town Responsible Peer (TRP), in turn, is selected from the set of DRPs within the districts of the town. A Province Responsible Peer (PRP) is selected from the set of TRPs of that province. Finally, the Country Responsible Peer (CRP) is selected from the set of PRPs of that country.

Authorities of various countries may want to enforce selection of peers operated by the authorities themselves as LARPs, i.e., as CRPs, PRPs, TRPs, DRPs, and MARPs. ALM protocols select cluster leaders (a LARP is always the highest level cluster leader in an ALM tree) using a leader election procedure. LAMID modifies this leader election procedure as follows.

When peers exchange membership information within a cluster in the ALM hierarchy, they include the type of each peer as part of this information. In the simplest case, the peer type is either "private" or "authority-owned."

Another change implemented in LAMID is that peers whose type is "authority-owned" always receive the highest priority in the leader election process. That is, if one of the peers that are eligible to become a leader is of this type, it is always selected.

Another modification implemented in the election procedure in the LAMID system is that certificates of peers that are eligible to become leaders need to be verified as part of the leader election procedure. More specifically, peers that advertise themselves as "authority-owned" should be able to show that they are authorized to do so. Thus, the peer-to-peer protocols (a peer protocol is the protocol spoken between the peers in a P2P overlay network) need to support the use of certificates. For example, RELOAD, which is described in Jennings et al., REsource LOcation And Discovery (RELOAD) Base Protocol, IETF, draft-ietf-p2psip-base-03, Jul. 13, 2009, the entire content of which is incorporated here by reference supports the use of certificates. A peer that advertises itself as being of type "authority-owned" should be able to present a certificate signed by the certificate authority (CA) of the overlay network in order to prove that the peer is indeed operated by an authority. Thus, the certificates used in the overlay network need to include the peer type.

According to an exemplary embodiment, the structure of the ALM trees for LAMID is discussed next. The CRPs, which are at the top of the hierarchy, form their own ALM tree, which contains only CRPs. Each CRP of a country may be the root of a second level ALM tree containing the PRPs of that country. Next, each PRP of a province (or state) may be a root of a third-level ALM tree, which includes the TRPs of that province. Each TRP of a town, in turn, may be the root of a fourth-level ALM tree containing all the DRPs of that town.

Next, each DRP of a district may be a root of a fifth-level ALM tree whose members include all the MARPs of that district. Finally, each MARP of a MA may be the root of a sixth-level ALM tree, which includes the peers located within that MA.

According to an exemplary embodiment, only a MARP can get selected as a DRP and only a DRP can become a TRP. Further, only TRPs can become PRPs and only PRPs can become CRPs. This also means that a CRP is always also a PRP, TRP, DRP, MARP, and also a regular peer.

Figure 10:
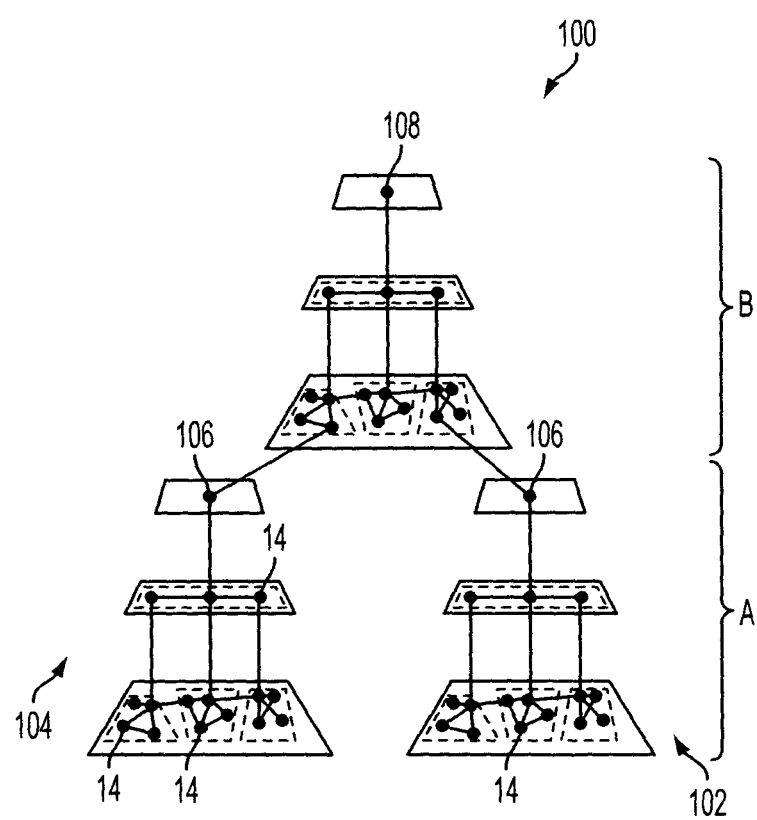
FIG. 10 is a schematic diagram of plural peer trees according to an exemplary embodiment.

FIG. 10 shows an example of the two lowest levels (A and B) in a hierarchy 100 discussed above. One skilled in the art would appreciate that the hierarchy discussed above is exemplary and not intended to limit the application of the exemplary embodiments. Other hierarchies may be construed based on other criteria, not necessarily geographical or political criteria. According to this exemplary embodiment, at the bottom level A, there are two ALM trees 102 and 104, which include regular peers. The roots of these trees are MARPs 106. The next level B includes an ALM tree whose members are MARPs 106. The root of this higher level tree is the DRP 108.

This figure also illustrates another aspect that is found in one or more of the exemplary embodiments discussed above. Each MARP 106 and each DRP 108 is also a peer 14. The peer may include a mobile communication device or a fixed communication device. The mobile communication device may be a cell phone, a mobile computer, etc. The fixed communication device may be a server, a computer, etc. Thus, the generic name of a node is used for describing all the above noted devices, i.e., cell phone, mobile computer, server, computer, etc.

Next, the identification of the DRPs, TRPs, PRPs and CRPs is discussed. MARPs are identified by the MAID, as discussed above. Identifiers of DRPs, called DRP-IDs, are created by taking a hash over a string that may be a concatenation of the name of the province (i.e., state), town, and the district. An example is hash("California San Francisco Chinatown"). A DRP may store its contact information in the bottom level overlay network using the DRP-ID as the key of the contact record.

Town Responsible Peer identifiers (TRP-IDs) may be created by taking a hash over a string that is a concatenation of the name of the province and the name of the town. Province Responsible Peer identifiers (PRP-IDs) may be created using a concatenation of the name of the country and the name of the province as an input to the hash function. Country Responsible Peer identifiers (CRP-IDs) may be created by taking a hash over the name of the country. Like DRP-IDs, also TRP-IDs, PRP-IDs, and CRP-IDs are used as keys of the contact records of these location area responsible peers.

Having discussed the structure of the novel system LAMID and the processes developed for handling various events that occur in the peers' world, the various types of mass events that may be handled by LAMID are discussed next.

The possible mass event types include but are not limited to: natural catastrophe (for example a tsunami); other type of a catastrophe (for example chemical explosion, fire); traffic related announcement (for example traffic jam or car accident); weather related announcement (for example local thunderstorm hits certain area); authority-generated announcement (for example dangerous prisoner escapes or a terrorist attack happens); event related mass announcement (for example a rock concert); advertisements (advertisements without need of subscription, based on local contents); etc.

Figure 11:
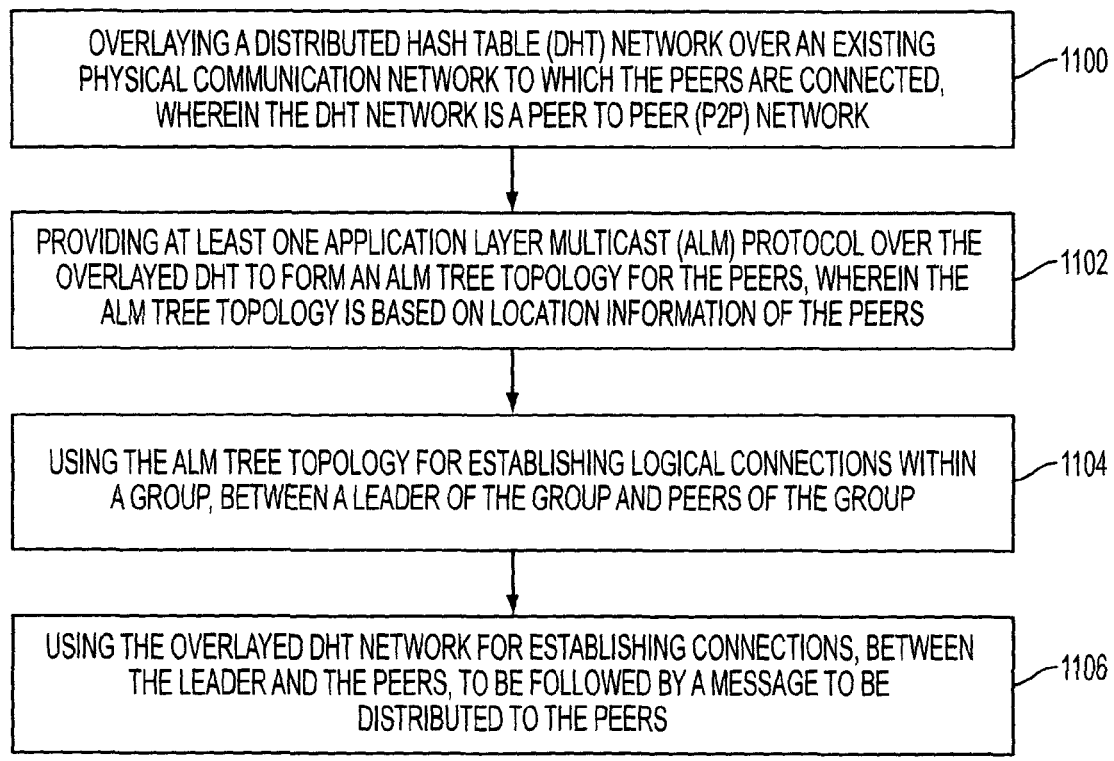
FIG. 11 is a flow chart illustrating steps for setting up the novel system according to an exemplary embodiment.

A method for implementing the LAMID system is discussed next with regard to FIG. 11. According to this exemplary embodiment, the method includes a step 1100 of overlaying a distributed hash table (DHT) network over an existing physical communication network to which the peers are connected, where the DHT network is a peer to peer (P2P) network; a step 1102 of providing at least one application layer multicast (ALM) protocol over the overlayed DHT to form an ALM tree topology for the peers, where the ALM tree topology is based on location information of the peers; a step 1104 of using the ALM tree topology for establishing logical connections within a group, between a leader of the group and peers of the group; and a step 1106 of using the overlayed DHT network for establishing connections, between the leader and the peers, to be followed by a message to be distributed to the peers. The message may be related to the possible mass events discussed above.

Information about these events may be transmitted from top to bottom in the LAMID system as will be discussed next. However, this novel system may also handle bottom to top communications. Regarding the top-down information distribution, the responsible peers (which initiate the information distribution) may be hosted by the authorities. Thus, the authorities may have the control and possibility to inform subscribers via the LAMID system about mass events when certain event is active and when it is no longer valid. For example, if a multimedia announcement needs to be played out to the peers, a URI pointing to the announcement is delivered to the peers using the LAMID system. One way of delivering an announcement is by sending a URI because this approach places only a small load on the LAMID system. Of course, other ways are possible for delivering the message, for example, simply transmitting the entire message.

According to an exemplary embodiment, at least a node for coordinating location aware mass information distribution to peers is discussed next. The at least a node may include a first application-level interface configured to interact with a distributed hash tables (DHT) network overlayed over an existing physical communication network to which the peers are connected. The DHT network is a peer to peer (P2P) network. The at least a node also may include a second application-level interface configured to communicate with an application layer multicast (ALM) protocol provided over the overlayed DHT to form an ALM tree topology for the peers. The ALM tree topology is based on location information of the peers. The at least a node also may include a processor configured to communicate with the first and second application-level interfaces and configured to use the ALM tree topology for establishing logical connections within a group, between a leader of the group and peers of the group, and to use the overlayed DHT network for establishing connections, between the leader and the peers, to be followed by a message to be distributed to the peers. The structure of such a node is described later with regard to FIG. 12.

Besides delivering information in a top-down fashion from root peers to lower level peers in the ALM tree, LAMID makes it possible to send information in the other direction as well. This bottom-up information delivery mechanism may be used to collect information from individual lower layer peers and distribute it to other peers in the LAMID network or for other purposes.

Bottom-up information may be sent either automatically or manually. If the information is sent manually, sending of a bottom-up event is triggered by user action. If the information is sent automatically, a sensor information in the user terminal is used to trigger the event. As a non-limiting example, if an accelerometer of the user's device detects that a speed of the vehicle has dropped to zero in the middle of a highway, it can issue an event notification to signal that the road may be congested. Other examples are possible as would be appreciated by those skilled in the art.

Bottom-up information may be sent to the location area responsible peer of the location area, for instance, to the MARP of the current MA, unless the event is generated by the MARP itself. The handling of mass events is hierarchical. When there are enough indications from lower level peers (this depends on the structure of LAMID, the scope of the event, etc. and the "enough" indications may be one event in some applications or a plurality of events in other applications), the LARP may trigger a mass event to all users in the geographical area and also involves higher level LARPs about the mass event. If there are enough indications from lower level LARPs, then higher level mass event is triggered to a larger geographical area.

Another example is related to an outburst of a new flu, e.g., the swine flu. Considering that various LAMG include peers that have the swine flu, the peers may report the existence of the swine flu to the corresponding LARP, which further reports upwards across the ALM tree the existence of the swine flu. The trigger event may be one single case of swine flu. For the LARPs in higher levels of the ALM tree, like for the DRPs, the trigger event for reporting the existence of the swine flu in their peers may be, for example, 100 cases. When counting 100 cases of swine flu among their peers, the DRPs may report the situation to the CPRs, which may declare an epidemic situation based on the number of swine cases. This example shows, among other things, that the trigger event depends from case to case and from level to level.

As another non-limiting example, a MARP can trigger a mass event to the DRP of the district in which it is currently located. In order to do this, the MARP uses its current coordinates to determine the name of the district in which it is located. Once it has this information, it creates the DRP-ID using the procedure described above and fetches the contact record of the DRP from the bottom level overlay network. Next, the MARP can send the mass event to the DRP by routing it across the bottom level overlay network.

At the highest level of the hierarchy, CPRs have a decision logic implemented, based on which they will assign an international event. The decision logic is based on the severity and scale of the mass event which has been reported to it by the lower level LARPs. An example of such a case is a nuclear power plant accident. The responsible peers have also the possibility to contact the authorities.

Distribution of false, hazardous information may be made illegal. However, this a policy to be implemented by each CRP based on the legal and social realities of each country. The authorities (or the location area responsible, at least for national level responsible peers, that is, CRPs) may keep track of the informers of reported events for certain periods of time. Also, certificates can be used to identify users and reduce spamming. Automatic connections can be implemented in the LAMID system to contact regular emergency centers so that the appropriate personnel, which may not be connected to the LAMID system, can be reached.

Another form of bottom-up information is detecting that a size of a LAMG has become larger than an average size of such a group. This information can be interpreted, for instance, as an indication of a traffic jam (e.g., when the same MA has a very high number of users). Thus, the LAMID system has the capability to perform maintenance tasks based on the bottom-up information received by the peers.

Still another form of bottom-up information is the simultaneous failure of large number of peers in the same LAMG. If other peers in the LAMG detect that a large number of nearby peers have failed simultaneously, the LAMID system can consider this as an indication that something unusual is going on in that location area. In such a case, a warning can be issued towards higher layers of the LAMID system.

While the above features are system wide features, some terminal specific features are discussed next. Nowadays, many mobile devices are equipped with a variety of different sensors. According to an exemplary embodiment, in addition to a GPS receiver, examples of other sensors included in mobile devices are an acceleration sensor, heart rate monitor, temperature sensor, altimeter, barometer, illumination sensor, radio signal strength sensor, velocimeter, etc. Application Programming Interfaces (APIs) like the Java Standardization Request (JSR) 256 make the sensor information available to various applications. Therefore, a LAMID application running in a terminal can monitor the information coming from these sensors. If abnormal values are detected (e.g., very high or low heart rate, sudden rise in temperature, sudden drop in velocity, etc.), the application can automatically contact a corresponding MARP and report this change. If a sufficient number of abnormal sensor values are received (the "sufficient number" depends from application to application) from different users (e.g., the speed of a large number of vehicles drops to zero suddenly) located in the same MA, the information is transmitted up in the LAMID hierarchy. If a predetermined threshold level is reached, an announcement can be triggered either to authorities, other peers in the system, or both.

According to another exemplary embodiment, the mobile phones may have enhanced displaying logic related to mass events received over the LAMID system. As a non-limiting example, in case of a national level mass event, the announcement may be played out to the user of the mobile phone and the phone's display may blink, indicating the same information in textual format and with a certain color. The mass events may also be targeted for small geographical areas, as for example, to those users located in a certain building that experiences a fire. Other examples of this type of events may include an icy road or a car crash. The user's mobile terminal or navigator device could include a P2P client. This P2P client could then be connected to the LAMID system and inform other users within this area via the location area responsible peer.

Also, it is known that users may ignore certain types of mass information in the P2P client (for example advertisements). However, the promoted (paid) advertisements could occupy certain area in terminal's display or be played out to the user only when the user is close to certain geographical area.

Another enhancement to mobile terminal is related to the ease-of-use for reporting of mass events. The mobile terminal could be added with either a specific button or the mass event type selection could be activated when a certain button is pressed for long time (5 seconds for example). Making an emergency report (or other mass event report) could be also achieved by using a voice activation control in the mobile phone. Also, a single emergency call could be initiated in the same way.

According to an exemplary embodiment, some of the peers in the LAMID system may be connected to legacy networks. For instance, peers operated by authorities could relay bottom-up announcements that the LAMID system considers to be critical to legacy networks. Such peers would act as gateways, between the LAMID system and legacy networks.

Additionally, the peer identifiers and mass event information could be stored together with International Mobile Subscriber Identity (IMSI) in the operator database for the corresponding operator. Mass event handling interaction with legacy network subscribers could be triggered by the operator using the information stored in the database. The operator could use the gateways and servers to connect to users which are not reached via the mechanism offered by the LAMID system.

In disaster situations, it is possible that part of the wireless network infrastructure (the physical communication network) is damaged and users in the affected areas cannot be reached. In such situations, terminals with multiple wireless interfaces (e.g., Bluetooth and Wi-Fi in addition to a cellular network interface) can use these alternative interfaces to pass announcements among each other in an ad-hoc fashion. Terminals that are still reachable by base stations can inject announcements they receive from the cellular network to the ad-hoc network. In this way, peers belonging to a damaged network are still capable of receiving mass information.

According to another exemplary embodiment, mass events may be transmitted between different P2P networks. For example, P2P communication networks of different operators may use different P2P technologies (e.g., different DHT algorithms). In this case, announcements cannot easily propagate from one network to another. However, if the LAMID system has peers that are participating in more than one P2P communication network simultaneously, such peers can act as gateways between the two separate networks by forwarding announcements from one network to the other.

Advantages of the novel LAMID system have been discussed throughout this specification and may also be evident to those skilled in the art. However, some of the advantages are reiterated below. It should be understood that these advantages are not present in each exemplary embodiment discussed above. While some exemplary embodiments may have all these advantages, some may have none. These advantages are discussed next.

LAMID makes it possible to deliver information (e.g., public warnings) to a large number of peers in a Distributed Hash Table (DHT) based peer-to-peer (P2P) overlay network simultaneously. Without a mechanism like LAMID, this would not be possible in DHT-based P2P overlay networks such as Peer-to-Peer Session Initiation Protocol (P2PSIP) communication systems.

A mechanism like LAMID is a useful addition to public P2P communication systems such as those being standardized in the IETF.

LAMID can distribute information in a location aware manner; announcements are delivered only to those peers that are located in the area in which the announcement is relevant.

As information distribution is fully decentralized, LAMID avoids the major shortcoming of centralized systems, which is the existence of a single point of failure. Also, as information distribution is decentralized, there are no centralized components which could become overloaded.

Besides top-down information (e.g., information from authorities to users), LAMID can deliver information in the other direction as well. This information can include, for instance, warnings generated by users located within areas affected by a natural disaster. Public warnings are generated only if a sufficiently high number of warnings are received from users in the lower levels of the LAMID hierarchy.

LAMID attempts to minimize the overhead caused by maintenance of location area specific application layer multicast groups. LAMID does not require peers to maintain any additional connections for the delivery of mass announcements.

Besides delivery of public warnings or announcements, LAMID can be used for other purposes as well. Other potential use cases include, for instance, location-based advertisements in P2PSIP overlay networks.

LAMID opens up new possibilities to monitor where the users of a system using LAMID are currently located. As an example, if a high concentration of users is detected within a particular location area, this can be considered as an indication that something unusual is going on in that area.

The LAMID architecture is generic and thus, it can be applied to different DHT algorithms and ALM protocols.

Whether a system is using LAMID or not can be detected by observing whether there are tunneled messages exchanged by peers to maintain an overlay network on top of another overlay network.

Figure 12:
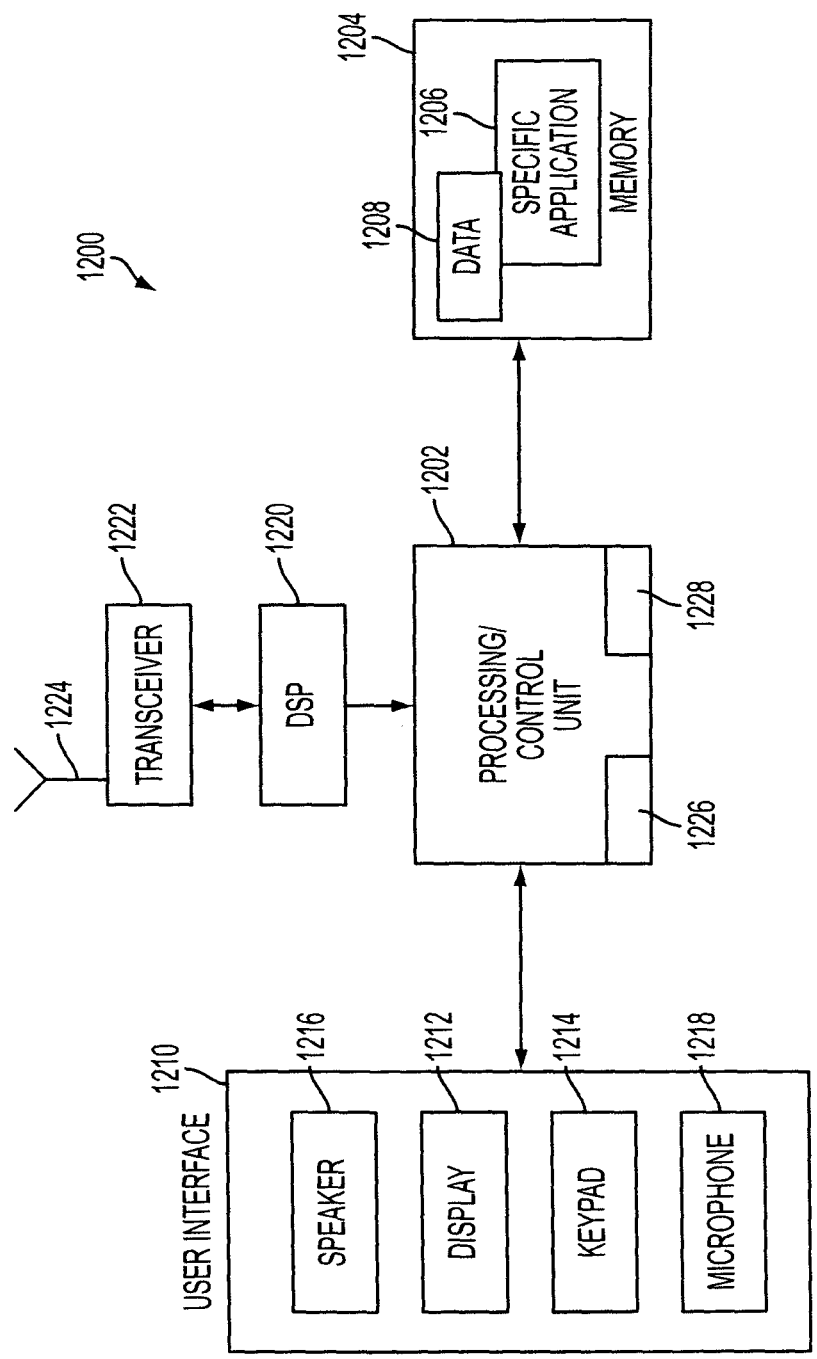
FIG. 12 is a schematic diagram of a node of the novel system.

For purposes of illustration and not of limitation, an example of a representative node capable of carrying out operations in accordance with the exemplary embodiments is illustrated in FIG. 12. It should be recognized, however, that the principles of the present exemplary embodiments are equally applicable to other computing systems.

The exemplary node 1200 shown in FIG. 12 may include a processing/control unit 1202, such as a microprocessor, reduced instruction set computer (RISC), or other central processing module. The processing unit 1202 need not be a single device, and may include one or more processors. For example, the processing unit 1202 may include a master processor and associated slave processors coupled to communicate with the master processor.

The processing unit 1202 may control the basic functions of the system as dictated by programs available in the storage/memory 1204. Thus, the processing unit 1202 may execute the functions described in FIGS. 6, 8, 9 and 11. More particularly, the storage/memory 1204 may include an operating system and program modules for carrying out functions and applications on the node. For example, the program storage may include one or more of read-only memory (ROM), flash ROM, programmable and/or erasable ROM, random access memory (RAM), subscriber interface module (SIM), wireless interface module (WIM), smart card, or other removable memory device, etc. The program modules and associated features may also be transmitted to the node 1200 via data signals, such as being downloaded electronically via a network, such as the Internet.

One of the programs that may be stored in the storage/memory 1204 is a specific program 1206. As previously described, the specific program 1206 may interact with DHT network and ALP protocol to determine an appropriate LARP or other peers. The program 1206 and associated features may be implemented in software and/or firmware operable by way of the processor 1202. The program storage/memory 1204 may also be used to store data 1208, such as an ID of the peer, or other data associated with the present exemplary embodiments. In one exemplary embodiment, the programs 1206 and data 1208 are stored in non-volatile electrically-erasable, programmable ROM (EEPROM), flash ROM, etc. so that the information is not lost upon power down of the node 1200.

The processor 1202 may also be coupled to user interface 1210 elements associated with a mobile terminal. The user interface 1210 of the mobile terminal may include, for example, a display 1212 such as a liquid crystal display, a keypad 1214, speaker 1216, and a microphone 1218. These and other user interface components are coupled to the processor 1202 as is known in the art. The keypad 1214 may include alpha-numeric keys for performing a variety of functions, including dialing numbers and executing operations assigned to one or more keys. Alternatively, other user interface mechanisms may be employed, such as voice commands, switches, touch pad/screen, graphical user interface using a pointing device, trackball, joystick, or any other user interface mechanism.

The node 1200 may also include a digital signal processor (DSP) 1220. The DSP 1220 may perform a variety of functions, including analog-to-digital (ND) conversion, digital-to-analog (D/A) conversion, speech coding/decoding, encryption/decryption, error detection and correction, bit stream translation, filtering, etc. The transceiver 1222, generally coupled to an antenna 1224, may transmit and receive the radio signals associated with a wireless device.

In addition, the node 1200 may include a first application-level interface 1226 that is configured to interact with a distributed hash tables (DHT) network overlayed over an existing physical communication network to which the peers are connected. Node 1200 may also include a second application-level interface 1228 that is configured to communicate with an application layer multicast (ALM) protocol provided over the overlayed DHT to form an ALM tree topology for the peers. Although FIG. 12 shows the first and second interfaces 1226 and 1128 as part of processor 1202, according to an exemplary embodiment these two interfaces may be hosted by another node or device that node 1200 shown in FIG. 12.

The node 1200 of FIG. 12 is provided as a representative example of a computing environment in which the principles of the present exemplary embodiments may be applied. Node 12 may be part of the mobile device 14 shown in FIG. 2 or may be the mobile device 14. From the description provided herein, those skilled in the art will appreciate that the present invention is equally applicable in a variety of other currently known and future mobile and fixed computing environments. For example, the specific application 1206 and associated features, and data 1208, may be stored in a variety of manners, may be operable on a variety of processing devices, and may be operable in mobile devices having additional, fewer, or different supporting circuitry and user interface mechanisms. It is noted that the principles of the present exemplary embodiments are equally applicable to non-mobile terminals, i.e., landline systems.

The disclosed exemplary embodiments provide a system, method and node for transmitting mass information to various peers. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

As also will be appreciated by one skilled in the art, the exemplary embodiments may be embodied in a wireless communication device, a telecommunication network, as a method or in a computer program product. Accordingly, the exemplary embodiments may take the form of an entirely hardware embodiment or an embodiment combining hardware and software aspects. Further, the exemplary embodiments may take the form of a computer program product stored on a computer-readable storage medium having computer-readable instructions embodied in the medium. Any suitable computer readable medium may be utilized including hard disks, CD-ROMs, digital versatile disc (DVD), optical storage devices, or magnetic storage devices such a floppy disk or magnetic tape. Other non-limiting examples of computer readable media include flash-type memories or other known memories.

Although the features and elements of the present exemplary embodiments are described in the embodiments in particular combinations, each feature or element can be used alone without the other features and elements of the embodiments or in various combinations with or without other features and elements disclosed herein. The methods or flow charts provided in the present application may be implemented in a computer program, software, or firmware tangibly embodied in a computer-readable storage medium for execution by a specifically programmed computer or processor.

What is claimed is:

1. A method for location aware mass information distribution to peers, the method comprising:
   overlaying a distributed hash table (DHT) network over an existing physical communication network to which the peers are connected, wherein the DHT network is a peer to peer (P2P) network;
   providing at least one application layer multicast (ALM) protocol over the overlayed DHT network to form an ALM tree topology for the peers, wherein the ALM tree topology is based on location information of the peers;
   providing a service that takes as input a cell-id of a peer and generates as output the geographical location of the peer, wherein the cell-id is an identification of the peer to the physical communication network;
   comparing the geographical location of the peer to plural micro geographical location areas associated with the ALM tree topology for assigning the peer to a corresponding geographical location area;
   using the ALM tree topology for establishing logical connections within a geographical group, between a leader of the geographical group and neighbor peers in the geographical group, which are located in a specific geographical area;
   upon receiving a message to be mass distributed to the neighbor peers, using the overlayed DHT network for establishing physical connections between the leader and the neighbor peers; and mass distributing the message to the neighbor peers using the physical connections.

2. The method of claim 1, further comprising: using a same identifier for a peer in the DHT network and in the ALM protocol.

3. The method of claim 1, further comprising: connecting a user first to the DHT network and then to the ALM tree topology to become a peer.

4. The method of claim 1, further comprising:
   grouping the peers into geographical location area groups of ALM;
   determining a peer leader for each ALM geographical location area group; and
   performing communications among peers in a same ALM geographical location area group only across the DHT network.

5. The method of claim 4, further comprising: sending, when an event takes place and is relevant to at least one ALM geographical location area group, the message from the leader of the geographical location area group to the peers of the geographical location area group by using the DHT network based on the logical connections between the leader and the peers in the ALM tree topology.

6. The method of claim 1, further comprising: assigning various ALM tree topologies, based on geographical location information, to a national level, a regional level, a city level, and/or a local area level; selecting a national leader for the national level; selecting plural regional leaders for the regional level; selecting plural city leaders for the city level; and selecting plural local area leaders for the local area level, wherein said levels correspond to geographical areas.

7. The method of claim 6, further comprising:
   sending the message from the national leader to the plural regional leaders;
   each regional leader sending the message to peers in corresponding regional groups;
   city leaders from the regional groups sending the message to peers in corresponding city groups; and
   local area leaders from the city groups sending the message to peers in corresponding local area groups such that the message from the national leader is received by all peers subscribed to the DHT network and included in the ALM protocol.

8. The method of claim 7, wherein the message is one relating to a natural catastrophe, traffic announcement, weather announcement, authority-generated announcement, event related announcement, or an advertisement.

9. A system for location aware mass information distribution to peers, the system comprising:
   a distributed hash tables (DHT) network overlayed over an existing physical communication network to which the peers are connected, wherein the DHT network is a peer to peer (P2P) network;
   an application layer multicast (ALM) protocol provided over the overlayed DHT network to form an ALM tree topology for the peers, wherein the ALM tree topology is based on geographical location information of the peers; and
   at least a node, which is part of the physical communication network, configured
      to provide a service that takes as input a cell-id of a peer and generates as output the geographical location of the peer, wherein the cell-id is an identification of the peer to the physical communication network;
      to compare the geographical location of the peer to plural micro geographical location areas associated with the ALM tree topology for assigning the peer to a corresponding geographical location area;
      to use the ALM tree topology for establishing logical connections within a geographical group, between a leader of the geographical group and neighbor peers in the geographical group, which are located in a specific geographical area,
      upon receiving a message to be mass distributed to the neighbor peers, to use the overlayed DHT network for establishing physical connections, between the leader and the peers, and
      to mass distribute the message to the neighbor peers using the physical connections.

10. The system of claim 9, wherein the system is configured to use a same identifier for a peer in the DHT network and in the ALM protocol.

11. The system of claim 9, wherein the ALM protocol accepts a user to become a peer only after the DHT network has accepted the user.

12. The system of claim 9, wherein the node is configured to:
   group the peers into geographical location area groups of ALM;
   determine a peer leader for each ALM geographical location area group; and perform communications among peers in a same ALM geographical location area group only across the DHT network.

13. The system of claim 9, wherein the at least a node is further configured to:
  assign various ALM tree topologies, based on geographical location information, to a national level, a regional level, a city level, and/or a local area level;
  select a national leader for the national level;
  select plural regional leaders for the regional level;
  select plural city leaders for the city level; and
  select plural local area leaders for the local area level, wherein said levels correspond to geographical areas.

14. The system of claim 13, wherein the at least a node is further configured to:
  receive the message from the national leader and transmit it to the plural regional leaders;
  each regional leader sending the message to peers in corresponding regional groups;
  city leaders from the regional groups sending the message to peers in corresponding city groups; and
  local area leaders from the city groups sending the message to peers in corresponding local area groups such that the message from the national leader is received by all peers subscribed to the DHT network and included in the ALM protocol.

15. A node for coordinating location aware mass information distribution to peers, the node comprising:
  a first application-level interface configured to interact with a distributed hash tables (DHT) network overlayed over an existing physical communication network to which the peers are connected, wherein the DHT network is a peer to peer (P2P) network;
  a second application-level interface configured to communicate with an application layer multicast (ALM) protocol provided over the overlayed DHT network to form an ALM tree topology for the peers, wherein the ALM tree topology is based on geographical location information of the peers; and
  a processor configured
    to communicate with the first and second application-level interfaces,
    to provide a service that takes as input a cell-id of a peer and generates as output the geographical location of the peer, wherein the cell-id is an identification of the peer to the physical communication network;
    to compare the geographical location of the peer to plural micro geographical location areas associated with the ALM tree topology for assigning the peer to a corresponding geographical location area;
    to use the ALM tree topology for establishing logical connections within a geographical group, between a leader of the geographical group and neighbor peers in the geographical group, which are located in a specific geographical area,
    upon receiving a message to be mass distributed to the neighbor peers, to use the overlayed DHT network for establishing physical connections between the leader and the neighbor peers,
    to mass distribute the message to the neighbor peers using the physical connections.

16. The node of claim 15, wherein a same identifier is used for a peer in the DHT network and in the ALM protocol.

17. The node of claim 15, wherein the ALM protocol accepts a user to become a peer only after the DHT network has accepted the user.

18. The node of claim 15, wherein the processor is configured to:
  group the peers into geographical location area groups of ALM;
  determine a peer leader for each ALM geographical location area group; and
  perform communications among peers in a same ALM geographical location area group only across the DHT network.

* * * * *